(12) United States Patent
James et al.

(10) Patent No.: US 6,442,746 B1
(45) Date of Patent: Aug. 27, 2002

(54) PREVENTING DAMAGING OF LOW VOLTAGE PROCESSOR IN HIGH VOLTAGE SYSTEM

(75) Inventors: Patrick D. James, Olympia; Son H. Lam, Puyallup, both of WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/471,618

(22) Filed: Dec. 21, 1999

(51) Int. Cl.⁷ .............................................. G06F 17/50
(52) U.S. Cl. ...................................................... 716/14
(58) Field of Search ............................. 713/300; 716/1, 716/2, 14–16

(56) References Cited

U.S. PATENT DOCUMENTS 5,872,983 A * 2/1999 Walsh ........................ 713/300

* cited by examiner

*Primary Examiner*—Matthew Smith
*Assistant Examiner*—Thuan Do
(74) *Attorney, Agent, or Firm*—Schwegman, Lundberg, Woessner & Kluth, P.A.

(57) ABSTRACT

A method and apparatus for protecting a low voltage processor inserted in a high voltage processor connector includes a circuit that determines whether power can be safely asserted to the connector, or whether power should be disabled due to a non-compliant processor. A method enables power to the connector upon a determination that a compliant processor, a termination card, or an empty connector is present.

18 Claims, 2 Drawing Sheets

PREVENTING DAMAGING OF LOW VOLTAGE PROCESSOR IN HIGH VOLTAGE SYSTEM

FIELD

The present invention relates generally to processor socketing, and more specifically to a method and apparatus to prevent damaging a processor.

BACKGROUND

Microprocessors are delicate electronic equipment typically inserted into a motherboard to make contact with a card edge slot via a number of pins. Each of the pins has its own purpose and internal connections in the microprocessor. Microprocessors are provided with power through the pin connections to the motherboard. Various different processors have different power requirements.

In past microprocessor designs, a voltage regulator was typically provided on the motherboard. This voltage regulator regulated computer system power supplied to the motherboard and provided the exact amount of required power to the microprocessor and its internal components. The voltage regulator was programmed and constructed to determine the voltage level required by both the microprocessor core and cache, which typically required different voltages for operation. For each processor in a system design, one voltage regulator would be provided for each of the core and cache, since the core and cache required different voltages.

Newer microprocessor designs have advanced beyond the requirement for a voltage regulator on the motherboard. One such processor is the Cascade family of processors from Intel Corp. of Santa Clara, Calif. In the Cascade family of processors, the required voltage regulation has been moved into the processor itself. This allows the pin and power configurations for microprocessors to be standardized. Motherboards using the newer design deliver 5 or 12 volts power directly to the connector. However, older processors have the same pin configuration and layout as newer processors, because typically motherboards are designed to accommodate a wide variety of different processors. Because of this, if an older processor is connected into a newer connector, the provision of 5 volts or 12 volts to the processor without any voltage regulation could damage or destroy all or part of the processor.

For example, a Pentium® II Xeon processor manufactured by Intel Corp. of Santa Clara, Calif., has a pin configuration that matches today's newer processors, but does not have the internal voltage regulator of a newer processor. Therefore, a Pentium II® Xeon processor could be inserted into a 5 volt or 12 volt processor slot. If this occurs, the voltage supplied to the processor will most likely be too much for the processor, and will damage or destroy part or all of the processor.

It would be desirable to provide a processor slot configuration and a method for determining what type of processor is placed into a processor slot so as to enable power to the processor or inserted card when such high voltage will not damage the processor or card.

SUMMARY

In one embodiment, a method of preventing damage to a low voltage processor inserted into a high voltage processor connector includes detecting whether a high voltage compliant processor, a termination card, or an empty slot is present at the connector. If one of a high voltage compliant processor, a termination card, or an empty slot is detected, power is asserted to the connector.

In another embodiment, a circuit for detecting the presence of a high voltage compliant processor, a low voltage processor, a termination card, or an empty slot includes a series of logic gates arranged to assert a signal which is used to allow assertion of power to the processor.

Other embodiments are described and claimed.

DETAILED DESCRIPTION

In the following detailed description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
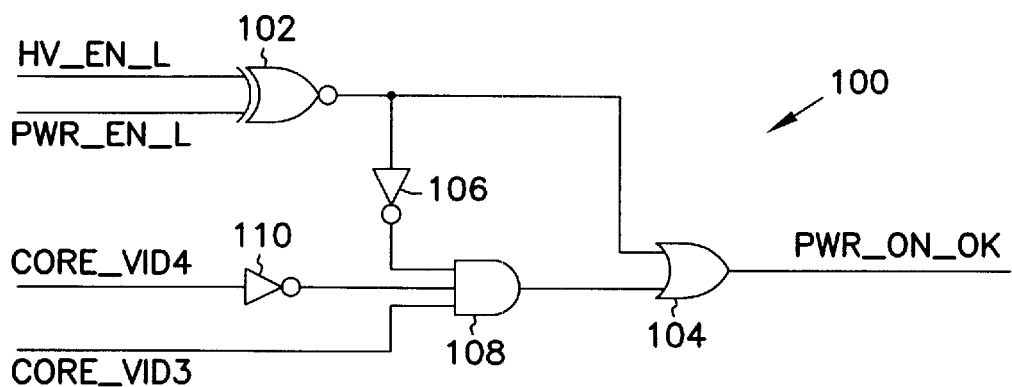
FIG. 1 is a circuit diagram of one embodiment of the present invention.

FIG. 1 is a circuit diagram of a circuit embodiment 100 of the present invention. The circuit 100 has four input signals and a single output signal. The four input signals are labeled as HV_EN_L, PWR_EN_L, CORE_VID3, and CORE_VID4. These input signals represent signals from a processor or termination card inserted into a processor or connector slot, in one embodiment a slot-2 processor slot. Pentium® II Xeon processors and Pentium® III Xeon processors have two power enable signals, PWR_EN[0] and PWR_EN[1]. These two pins are tied directly together on the processor, and can be used to detect processor presence by applying a voltage to one pin and observing it at the other. To show conductivity when a processor is plugged into a processor slot, the PWR_EN[0] and PWR_EN[1] signals are shorted together. By grounding one end of the signal pin which shorts the PWR_EN signals, the result can be used to detect the presence of a processor plugged into the slot. The grounded shorted PWR_EN[0] and PWR_EN[1] signals are referred to herein as PWR_EN_L.

While pins are discussed as electrical contacts for the processor, it should be understood that other electrical contacts, such as card edge contacts and other suitable electrical contacts may also be used without departing from the scope of the invention.

If the processor plugged into the processor slot is high voltage (5 volt or 12 volt) or Cascade compliant, the HV_EN_L signal will be pulled low. If both of the signals HV_EN_L and PWR_EN_L are low, then the output of exclusive nor (XNOR) gate 102 will be high according to the truth table for an XNOR gate.

Pullups on the motherboard pull the HV_EN_L and PWR_EN_L signals high as a default. If both signals are high, the XNOR gate 102 also passes a high signal at its output. This signal is fed to OR gate 104. According to the truth tables of an OR gate, if either of the signals presented as inputs to a two input OR gate are high, the output will be high. In this embodiment, a high output from OR gate 104 indicates that power may be supplied to the processor through the power supply routes of the processor slot. This branch of the circuit 100 indicates by a high output signal that a high voltage compliant processor or no processor at all is installed in the connector slot. This generates a high signal at the output of OR gate 104, allowing power to be asserted to the component installed in the connector slot.

Termination cards are used to properly terminate both ends of a system bus in a system in which multiple processors can be implemented. Each termination card has a set of core voltage identification bits which are used to determine if a termination card is plugged into a processor socket. Voltage identification bits used on slot-2 processors are CORE_VID3 and CORE_VID4. Unlike any known existing processors, a termination card is designed to pull the CORE_VID4 signal low and pull or leave the CORE_VID3 signal high. If a termination card is plugged into the processor slot, power to the system may be safely allowed. In the second branch of circuit 100, the CORE_VID3 signal, the complement of the CORE_VID4 signal, and the complement of the output from XNOR gate 102 are logically combined in AND gate 108. If a termination card is installed in the connector slot, then the complement of the output of XNOR gate 102 will be high, CORE-VID3 will be high, and the complement of CORE_VID4 will be high. Accordingly, the output from AND gate 108 will be high. This generates a high signal at the output of OR gate 104, allowing power to be asserted to the component installed in the connector slot.

signal is presented directly to AND gate 108. In the presence of a termination card, the signal from inverter 106 will be high, the CORE_VID3 signal will be high, and the signal from inverter 110 will be high. This will result in the output from AND gate 108 being high, and therefore the PWR_ON_OK signal also being high as the high output from AND gate 108 propagates through OR gate 104.

A truth table of possible inputs to circuit 100 and the resulting output PWR_ON_OK is shown in Table 1. Using the truth table, a determination is made by consulting the PWR_ON_OK signal as to whether the power supplies that supply power to the processor slot and consequently to the processor can be turned on. The PWR_ON_OK signal is used in one embodiment in conjunction with the power on reset logic for the power supplies of the system into which the processor or termination card is plugged to determine when the power supplies may be safely turned on. All combinations of possible signals and the resultant PWR_ON_OK signal values are shown in Table 1, wherein 0 indicates logic low, 1 indicates logic high, and X indicates logic don't care. Further, comments as to the exact status of the connector slot with respect to what is installed therein are determinable from the results.

TABLE 1

| HV_EN | PWR_EN | CORE_VID3 | CORE_VID4 | PWR_ON_OK | COMMENT |
|---|---|---|---|---|---|
| 0 | 0 | X | X | 1 | Cascade Card/Processor |
| 0 | 1 | X | X | 0 | Not Possible |
| 0 | 1 | X | X | 0 | Not Possible |
| 0 | 1 | X | X | 1 | Not Possible |
| 0 | 1 | X | X | 0 | Not Possible |
| 1 | 0 | 0 | 0 | 0 | Non-High Voltage Processor |
| 1 | 0 | 0 | 1 | 0 | Non-High Voltage Processor |
| 1 | 0 | 1 | 0 | 1 | Termination Card |
| 1 | 0 | 1 | 1 | 0 | Non-High Voltage Processor |
| 1 | 1 | X | X | 1 | Empty Slot |

There are therefore three possible high outputs for the PWR_ON_OK signal at the output of OR gate 104. They are as follows. First, if a high voltage compliant, or Cascade processor, is installed into the connector slot, the HV_EN_L and PWR_EN_L signals are both pulled low, so the output from XNOR gate 102 is high, and the PWR_ON_OK is high due to the propagation of the high XNOR output through OR gate 104.

Second, if no component is installed in the connector slot, the PWR_EN_L and HV_EN_L signals are each pulled high by motherboard pullups, and the output from XNOR gate 102 is high. This high signal propagates through to present a high PWR_ON_OK signal through OR gate 104.

Third, if a termination card is installed in the connector slot, the PWR_EN_L signal will be low and the HV_EN_L signal will be high, and therefore the output from XNOR gate 102 and the first input to OR gate 104 will be low. In that situation, the output from XNOR gate 102 is inverted by inverter 106 and presented to an input of AND gate 108. Two further inputs to AND gate 108 are from the signal pins which convey the level 2 voltage identification bits that uniquely identify a termination card. A termination card signature is the CORE_VID3 signal high and the CORE_VID4 signal low. The CORE_VID4 signal is passed through inverter 110 and the output from inverter 110 is passed to an input of AND gate 108. The CORE_VID3

In operation, the circuit 100 works as follows. Exclusive NOR gate 102 is operatively electrically connected to two input signals, HV_EN_L and PWR_EN_L. HV_EN_L is a signal that is pulled low when the processor connected to the slot is a high voltage compliant processor. PWR_EN_L is a signal that is pulled low when a processor or terminator card is detected in the processor slot. PWR_EN_L is derived from shorting together PWR_EN[0] and PWR_EN[1] signals. Such signals are fully described in the specifications for Intel Pentium processors such as the Pentium® II Xeon and Pentium® III Xeon processors manufactured by Intel Corp. of Santa Clara, Calif. In one embodiment, the PWR_EN_L and HV_EN_L inputs are pulled high as a default by pull-up resistors or transistors, so that if no component is present in the processor slot, the XNOR gate 102 has as its output a high signal. When both PWR_EN_L and HV_EN_L are low, this indicates a Cascade type high voltage processor present in the processor slot, and a high signal is generated at the output of the XNOR gate 102. Any high signal at the output of the XNOR gate will propagate through to the PWR_ON_OK signal through OR gate 104.

The output of XNOR gate 102 is connected through inverter 106 to one of the inputs of AND gate 108. If the output of XNOR gate 102 is low, a high signal is presented to one of the inputs of the AND gate 108, and the output of the AND gate 108 is determined by the core voltage identification bits. The core voltage identification bit signals, as described above, are connected to the remaining inputs of the AND gate 108, with the CORE_VID4 signal connected through inverter 110. If a termination card has been inserted into the processor slot, the CORE_VID4 signal will be a logic low, and the CORE_VID3 signal will be a logic high. In that instance, the voltage identification bit signals to the AND gate 108 are both high, and a high signal at the output of the AND gate 108 propagates through to the PWR_ON_OK signal at the output of OR gate 104.

Therefore, in this embodiment, there are three situations in which the PWR_ON_OK signal is logic high, indicating to the connector that 5 volts or 12 volts are to be supplied to the processor. The first situation is when a Cascade or high voltage processor is installed into the processor slot. In this instance, both the HV_EN_L and PWR_EN_L signals are low, and a high logic signal propagates through the circuit to assert a high logic value as the PWR_ON_OK signal. In this instance, the levels of the voltage identification bits do not matter, as the output of the OR gate 104 will be high no matter what the VID signals are.

The second situation is when no processor or termination card is installed in the processor slot. In this instance, pull-ups on the HV_EN_L and PWR_EN_L pins force the output of XNOR gate 102 high, which propagates a logic high through to the PWR_ON_OK signal through OR gate 104. The VID bits again can be any combination of logic levels without changing the PWR_ON_OK signal.

The third situation is when a termination card has been installed into the processor slot. In such a situation, the HV_EN_L signal will be high and the PWR_EN_L signal will be low. The termination card is designed to pull the CORE_VID3 signal high, and to pull the CORE_VID4 signal low. This combination forces the output from AND gate 108 high, propagating a logic high PWR_ON_OK signal at the output of OR gate 104.

If a non-high voltage compliant processor is installed in the connector slot, then the HV_EN_L signal will be high, indicating a non-high voltage compliant processor. Further, the PWR_EN_L signal will be low as it is grounded in the presence of a processor or termination card, so that the output from XNOR gate will be low. Only if a termination card is installed in the connector slot will the level 2 cache bits be properly set so as to pass a high logic through to the OR gate 104.

In one embodiment, the circuit 100 is contained as part of a motherboard. The PWR_ON_OK signal is consulted before the power supplies are allowed to assert power to the processor or card plugged into the processor slot. If the PWR_ON_OK signal is high, then motherboard logic knows that power may be presented through the power supplies to the power pins of the connector.

In another embodiment, a multiple processor system has a circuit such as circuit 100 for each processor in the multiple processor system.

Figure 2:
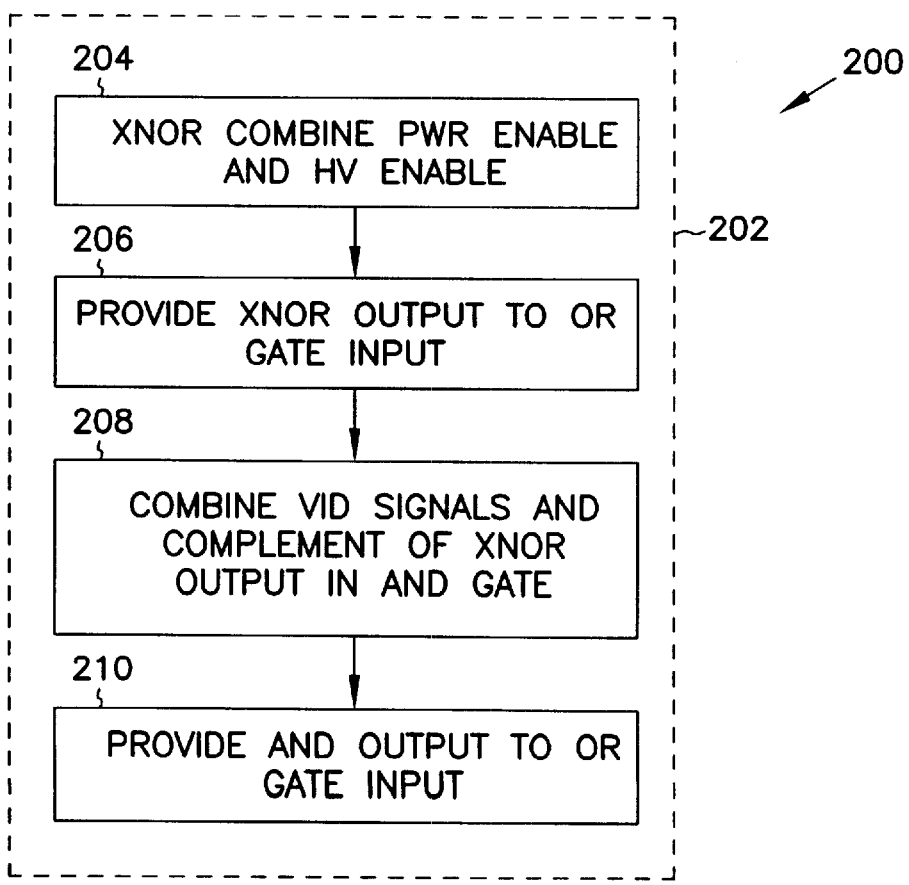
FIG. 2 is a flow chart diagram of a method embodiment of the present invention.

In another embodiment shown in FIG. 2, a method 200 for determining whether power can be asserted to a connector slot comprises determining whether a PWR_ON_OK signal is at a logic high in block 202. The determination of whether the PWR_ON_OK signal is at a logic high comprises evaluating a number of signals including PWR_EN_L, HV_EN_L, CORE_VID3 and CORE_VID4 as follows. PWR_EN_L and HV_EN_L signals are combined in an exclusive NOR gate in block 204, and the output is provided to one of the inputs of an OR gate at 206. CORE_VID3 and complement of CORE_VID4 signals are combined with the complement of the exclusive NOR gate output in an AND gate at 208, and the output of the AND gate is provided to the other input of the OR gate at 210. The resultant signal indicates whether power can be supplied to the connector slot. A combination such as this is provided for each processor in a multiple processor system.

Figure 3:
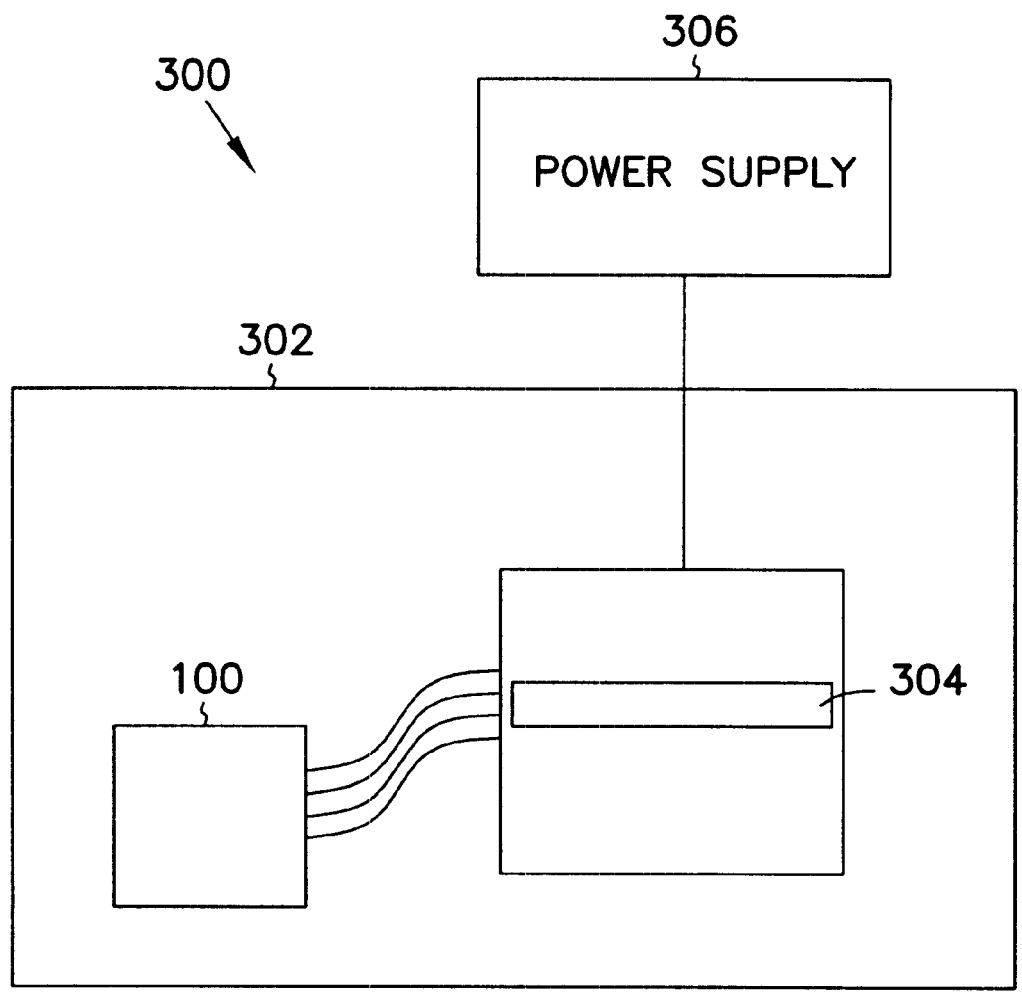
FIG. 3 is a block diagram of a motherboard and processor according to another embodiment of the present invention.

FIG. 3 shows an embodiment 300 of a motherboard 302 having a processor connector slot 304 for connection of a processor to the motherboard. Motherboard 302 is connected to power supply 306, which also supplies power through the motherboard 302 to connector slot 304, and therefore to a processor or termination card installed in connector slot 304. Circuit 100 is operatively electrically connected to connector slot 304, and receives the PWR_EN_L, HV_EN_L, CORE_VID3 and CORE_VID4 signals described above. Circuit 100 allows power supply 306 to assert power to an installed component in connector slot 304 when the circuit 100 determines that it is safe to assert power to the installed component.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for preventing damage to a low voltage processor inserted into a high voltage processor system, comprising:
   determining whether a high voltage processor is present in the processor slot by logically combining a high voltage enable signal and a power enable signal from the processor;
   determining whether a termination card is present in the processor slot;
   determining whether the processor slot is empty; and
   setting a power on okay signal on determining that a high voltage processor, a termination card, or an empty slot is present.

2. The method of claim 1, wherein the combining is performed in an exclusive NOR gate.

3. The method of claim 1, wherein determining whether the processor slot is empty comprises logically combining a high voltage enable signal and a power enable signal from the processor.

4. The method of claim 1, wherein determining whether a termination card is installed comprises logically combining a core identification bit 3 signal and a core voltage identification bit 4 signal complement from the processor, and a complement of a logical combination of a high voltage enable signal and a power enable signal from the processor.

5. The method of claim 4, wherein the logical combination of the core identification bit 3 and the core identification bit 4 complement is performed in an AND gate.

6. The method of claim 1, wherein the determinations are made in a different order.

7. A circuit, comprising:
   a connector to receive an electrical component; and
   connector logic operatively electrically connected to the connector for logically combining signals from the component to determine the identity of the component, the connector logic comprising
   an exclusive or gate having two inputs connectable to a high voltage enable signal and a power enable signal;

an inverter connected to the output of the exclusive or gate;

a second inverter with an input connectable to a core identification bit 4 signal slot;

an and gate having three inputs, the first input connected to the output of the inverter, the second input connected to the output of the second inverter, and the third input connectable to a core identification bit 3 signal slot; and an or gate having two inputs, the first input connected to the output of the exclusive or gate, and the second input connected to the output of the and gate.

8. The circuit of claim 7, wherein the connector logic is configured to assert a signal to power to the connector upon a determination that power may safely be asserted to the connector.

9. The circuit of claim 7, wherein the connector logic is configured to determine whether the connector is empty, or whether the connector contains a high voltage compliant processor, a termination card or a non-high voltage processor.

10. A method comprising:

determining whether power to a processor connector may be safely asserted, including determining whether a high-voltage processor is installed by logically combining a high voltage enable signal and a power enable signal; and asserting power to the processor connector on a determination that power may be safely asserted.

11. A method comprising:

determining whether power to a processor connector may be safely asserted, including determining whether the processor connector is empty by logically combining a high voltage enable signal and a power enable signal; and asserting power to the processor connector on a determination that power may be safely asserted.

12. A method comprising:

determining whether power to a processor connector may be safely asserted, including determining whether a termination card is installed in the processor connector by logically combining a core identification bit 3 signal, a core identification bit 4 complement, and a complement of a logical combination of a high voltage enable signal and a power enable signal; and asserting power to the processor connector on a determination that power may be safely asserted.

13. A connector for a processor, comprising:

a plurality of processor contacts configured to accept a connector component;

a circuit for enabling power to the connector upon a determination that the component is high voltage compliant, wherein the circuit comprises connector logic for logically combining signals from the component installed in the connector to determine the identity of the component, the connector logic including:

first logic for combining a high voltage enable signal and a power enable signal;

second logic for inverting the output of the first logic;

third logic for inverting a core identification bit 4 signal;

fourth logic for combining the output of the second logic, the output of the second logic, and a core identification bit 3 signal; and fifth logic for combining the output of the first logic and the output of the fourth logic.

14. The connector of claim 13, wherein the first logic is an exclusive NOR gate.

15. The connector of claim 13, wherein the fourth logic is an AND gate.

16. The connector of claim 13, wherein the fifth logic is an OR gate.

17. A motherboard, comprising:

a processor connector;

a power supply operatively electrically connected to the motherboard and the processor connector; and a circuit for enabling power to the connector upon a determination that a termination card or a high voltage compliant processor is installed in the connector slot, the circuit including:

connector logic for logically combining signals from the component installed in the connector to determine the identity of the component, the connector logic including:

first logic for combining a high voltage enable signal and a power enable signal;

second logic for inverting the output of the first logic;

third logic for inverting a core identification bit 4 signal;

fourth logic for combining the output of the second logic, the output of the second logic, and a core identification bit 3 signal; and fifth logic for combining the output of the first logic and the output of the fourth logic.

18. The motherboard of claim 17, wherein the circuit is contained within the processor connector.

* * * * *